No. 765,677. PATENTED JULY 26, 1904.
M. H. PIGOU.
CIGAR HOLDER.
APPLICATION FILED OCT. 3, 1903.
NO MODEL.
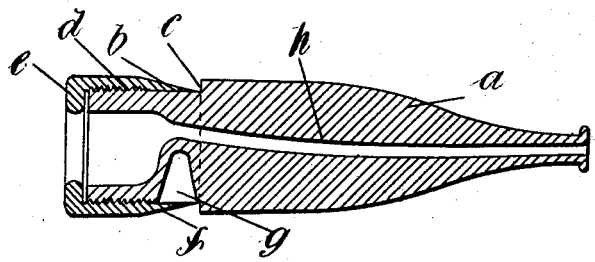
Witnesses
William Crossley
George Hunt
Inventor
Meynell Henry Pigou
By: George Hughes
Attorney.

No. 765,677. Patented July 26, 1904.

UNITED STATES PATENT OFFICE.

MEYNELL HENRY PIGOU, OF DARTFORD, ENGLAND.

CIGAR-HOLDER.

SPECIFICATION forming part of Letters Patent No. 765,677, dated July 26, 1904.

Application filed October 3, 1903. Serial No. 175,659. (No model.)

*To all whom it may concern:*

Be it known that I, MEYNELL HENRY PIGOU, a subject of the King of the United Kingdom of Great Britain and Ireland, residing at Bignores, Dartford, in the county of Kent, England, have invented new and useful Improvements in Cigar-Holders, of which the following is a specification.

This invention relates to improvements in cigar-holders, the object being to combine therewith means for cutting off the ends of cigars prior to smoking.

In carrying my invention into effect I proceed in or in about the following manner, making reference to the accompanying drawing, which shows a longitudinal section of the device: I provide a cigar-holder $a$, made of any suitable material and having its outer end reduced in diameter, as at $b$, to form a circumferential shoulder $c$. The outer end of the reduced portion $b$ is provided with a screw-thread $d$, of fine pitch, over which is screwed an open-ended cap or ferrule $e$, having its inner end $f$ sloped off to a cutting edge, which when the cap is screwed quite home comes in contact with the shoulder $c$. Above the shoulder $c$ is provided a recess $g$ in the side of the holder to receive the end of the cigar which is to be cut off, and, if necessary, the drawway of the tube may be diverted somewhat, as at $h$, to allow the recess $g$ to be of sufficient depth without opening into the drawway.

In use the cap or ferrule is unscrewed sufficiently to uncover the recess $g$. The cigar end is inserted into the recess and the cap screwed down till its cutting edge contacts with the shoulder $c$, thus cutting off by a sawing action the end of the cigar, which is kept within the recess $g$, from which it can be ejected when the next cigar is to be dealt with.

What I claim as my invention, and desire to secure by Letters Patent, is—

1. A cigar-holder having a screw-threaded end of reduced diameter so as to provide a circumferential shoulder: an open-ended cap to screw over the said reduced end and having a cutting edge at its inner end which can contact with the said shoulder, the cigar-holder itself having a side recess over which the cap passes when screwed on, substantially as hereinbefore described.

2. The combination of a cigar-holder having a side recess near its holding end and a screw-on cap provided with a cutting edge substantially as hereinbefore described.

In testimony whereof I have signed my name to this specification in the presence of two subscribing witnesses.

MEYNELL HENRY PIGOU.

Witnesses:
FREDERICK A. P. PIGOU,
FLORENCE PIGOU.